March 21, 1967     H. E. NELSON     3,310,332
LITTER FORK AND YARD TOOL
Filed Oct. 22, 1964
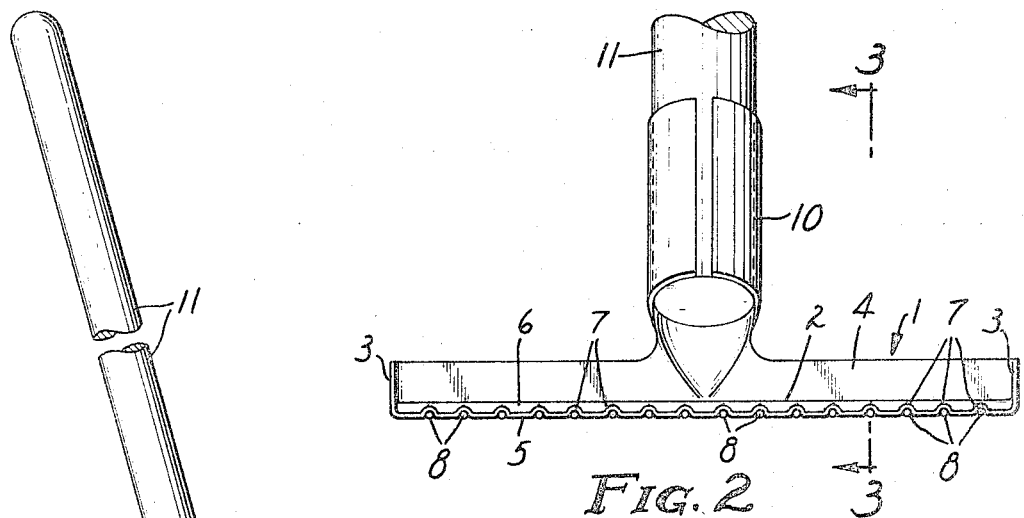
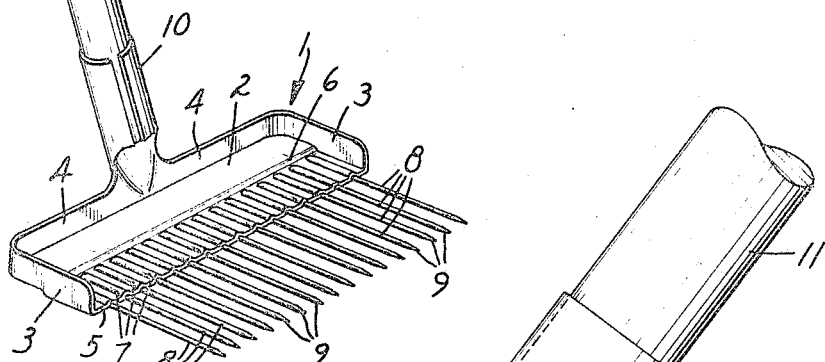
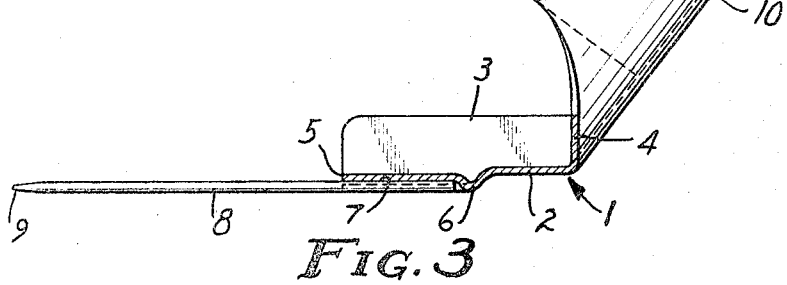
INVENTOR
HERBERT E. NELSON
BY Merchant, Merchant & Gould
ATTORNEYS

United States Patent Office 3,310,332
Patented Mar. 21, 1967

3,310,332
LITTER FORK AND YARN TOOL
Herbert E. Nelson, 5836 Wentworth Ave. S., Minneapolis, Minn. 55419
Filed Oct. 22, 1964, Ser. No. 405,735
1 Claim. (Cl. 294—55.5)

This invention relates to yard tools, and more particularly to a tool for picking up litter from the ground.

It is well known that unconfined pets, such as dogs, are prone to deposit their droppings on lawns and other open areas, creating a highly disagreeable problem of disposal of the droppings.

The primary object of this invention is the provision of a tool by means of which animal droppings or other litter may be removed from lawns and the like without injury to the grass or like vegetation and in a quick and easy manner.

Another object of this invention is the provision of a tool as set forth which may be used as a rake or cultivating implement in small areas of limited access.

Another object of this invention is the provision of a tool of the above type which is simple and inexpensive to produce, which may be easily cleaned, which is highly efficient in operation, and which is rugged in construction and durable in use. The above, and still further highly important objects and advantages of this invention will become apparent from the following detailed specification, appended claim and attached drawings.

Referring to the drawings, which illustrate the invention, and in which like reference characters indicate like parts throughout the several views:

FIG. 1 is a view in perspective of a litter fork and yard tool made in accordance with the invention, some parts being broken away;

FIG. 2 is an enlarged fragmentary view in front elevation; and

FIG. 3 is a further enlarged fragmentary view in section, taken on the line 3—3 of FIG. 2.

In the preferred embodiment of the invention illustrated, a generally rectangular body is indicated in its entirety by the numeral 1. The body 1 is preferably formed from sheet metal or other suitable material and comprises a generally flat bottom wall portion 2 and opposed side wall portions 3 and a rear wall portion 4 extending upwardly from the opposite side and rear edges respectively of the bottom 2. The side wall portions 3 terminate at their forward edges even with the front edge 5 of the bottom wall 2 whereby the body 1 has an open front.

Generally centrally between the front edge 5 and the rear wall 4, the bottom wall 2 is formed to provide a downwardly projecting ridge 6 that extends the full width of the body 1. Forwardly of the ridge 6, the bottom wall 2 is corrugated to provide a plurality of laterally spaced parallel seats 7 that extend forwardly from the ridge 6 to the front edge 5 of the bottom wall 2. A plurality of rigid tines 8 are mounted at their rear end portions each in a different one of the seats 7, the tines projecting forwardly from the front edge 5 in laterally spaced parallel relationship. Preferably, the tines 8 are made from stiff wire or the like and are secured to the corrugated portion of the bottom wall 2 by spot welding or the like. Also preferably, the front ends of the tines 8 are rounded or pointed, as indicated at 9.

The body 1 has integrally formed therewith a longitudinally split generally cylindrical ferrule 10 that projects angularly rearwardly and upwardly from the central portion of the rear wall portion 4 for reception of an elongated handle 11. The handle 11 may be made from wood, metal or any suitable material, the lower end thereof being preferably frictionally held within the ferrule 10.

When the device of this invention is used to remove animal droppings or other objectionable material from a lawn, the tool is held so that the tines 8 are substantially horizontal or downwardly tilted in a forward direction so that the tines 8 move between the blades of grass and underneath the material to be removed. The device is then raised in a vertical direction so that the tines 8 move upwardly between the blades of grass with a combing action, engaging the material and lifting the same away from the grass. At the same time, the handle 11 is tilted downwardly and rearwardly so that the material resting on the tines 8 will tend to move toward the rear wall 4, whereby to prevent the same from accidentally dropping from the tool. Thus, the material may be carried to a suitable point of disposal with a minimum of handling and without being touched by the operator's hands. With the use of this device as described, little if any, of the material adheres to the grass, and such material that may adhere to the grass or to the tool may be quickly and easily washed away with the aid of a conventional garden hose. The combing action of the teeth 8 on the long grass leaves the grass in a substantially undisturbed condition without injury to the sod, such as often occurs when such implements as spades and the like are used to remove droppings.

While the instant device is primarily intended for use in removing litter from the ground, as above described, the same may be effectively used to rake leaves and other material from the ground between closely spaced plants and shrubs, as well as other areas where difficulty may be experienced in using a conventional garden rake.

While I have shown and described a commercial embodiment of my litter fork and yard tool, it will be understood that the same is capable of modification without departure from the spirit and scope of the invention, as defined in the claim.

I claim:

A litter fork and yard tool comprising:
(a) a scoop-like body having a generally flat, normally horizontally disposed bottom wall portion and opposed side and rear wall portions projecting upwardly from opposite side and rear edge portions respectively of said bottom wall portion and providing an open front,
(b) means on said body for attachment to a handle,
(c) said bottom wall portion being formed to provide a downwardly projecting transverse ridge extending the full width of said body in rearwardly spaced generally parallel relation to the open front of said body, and a plurality of corrugations adjacent said open front and defining laterally spaced downwardly opening parallel seats extending from said ridge to said open front of the body,
(d) and a plurality of rigid tines each having a rear end portion secured in a different one of said downwardly opening seats and extending from said ridge forwardly of the open front of said body.

References Cited by the Examiner
UNITED STATES PATENTS

| 427,055 | 5/1890 | Cushing | 294—55.5 X |
| 455,557 | 7/1891 | Wynkoop | 294—55 X |
| 1,435,061 | 11/1922 | Halsey | 294—55.5 X |

FOREIGN PATENTS 32,598   2/1905   Switzerland.

GERALD M. FORLENZA, *Primary Examiner.*
G. F. ABRAHAM, *Assistant Examiner.*